(12) United States Patent
Nelson

(10) Patent No.: US 6,623,021 B1
(45) Date of Patent: Sep. 23, 2003

(54) AUTOMATED BICYCLE STEERING LOCK

(76) Inventor: Edward Scott Nelson, 103 - 11th St., S., Bradenton Beach, FL (US) 34217

( * ) Notice: Subject to any disclaimer, the term of this patent is extended or adjusted under 35 U.S.C. 154(b) by 0 days.

(21) Appl. No.: 10/088,837

(22) PCT Filed: Mar. 19, 2002

(86) PCT No.: PCT/US02/08738

§ 371 (c)(1),
(2), (4) Date: Mar. 19, 2002

(51) Int. Cl.[7] ............................................... B62K 27/00
(52) U.S. Cl. ...................... 280/204; 280/272; 280/292
(58) Field of Search .................. 280/204, 202, 280/292, 304.5, 293, 272

(56) References Cited

U.S. PATENT DOCUMENTS

| 2,629,611 | A | * | 2/1953 | Covington | |
| 4,445,704 | A | * | 5/1984 | Troxler | 280/292 |
| 5,039,120 | A | * | 8/1991 | Stowe | 280/204 |
| 5,749,592 | A | * | 5/1998 | Marchetto | 280/292 |
| 5,829,316 | A | * | 11/1998 | Krizman, Jr. | 74/551.8 |
| 6,050,580 | A | * | 4/2000 | Pawelek | 280/204 |
| 6,155,582 | A | * | 12/2000 | Bourbeau | 280/204 |
| 6,286,847 | B1 | * | 9/2001 | Perrin | 280/204 |
| 2003/0025295 | A1 | * | 2/2003 | Snobl | 280/292 |

* cited by examiner

Primary Examiner—Avraham Lerner
(74) Attorney, Agent, or Firm—Dorothy S. Morse

(57) ABSTRACT

A steering lock, and a method of use, for connecting child's bicycle (2) behind adult bicycle (4), with the front wheel (6) of child's bicycle (2) being elevated so that the adult rider retains steering control. The steering lock comprises receiver (20) or pivot receiver (30) attached to the head tube (13) of child's bicycle (2), a coupler (22) attached to a bicycle tow bar (24) on adult bicycle (4), and a steering lock pin (10). As coupler (22) is secured against receiver member (20) or pivot receiver (30) with quick-release safety pin (25), steering lock pin (10) is forced through aligned holes in head tube (13), steering fork tube (15), and handlebar stem tube (17) on child's bicycle (2) to lock one to the other during tandem travel. Thus, child's bicycle (2) can be expediently converted from independent operation to a tandem configuration multiple times during the same ride.

20 Claims, 12 Drawing Sheets

AUTOMATED BICYCLE STEERING LOCK

TECHNICAL FIELD

This invention relates to devices for attaching two bicycles to one another during use, specifically to a steering lock, and a method for its use, which can be used with a bicycle tow bar to rapidly and securely attach a child's bicycle behind the larger bicycle of an adult for tandem travel. In its towed position the front wheel of the child's bicycle is preferably elevated and unable to engage the ground, thus allowing the adult rider to retain steering control while the child chooses to pedal or coast. One end of the bicycle tow bar is connected to the adult bicycle, with the coupler member of the steering lock being attached to the opposing distal end of the tow bar. The steering lock of the present invention also comprises a receiver member that is attachable to the head tube of the child's bicycle. Thus, when the coupler member becomes engaged with the receiver member, while the front wheel of the child's bicycle is also in the longitudinally directed position required to align holes in the front surfaces of the head tube, the steering fork tube, and the handlebar stem tube of the child's bicycle, the coupler member is able to promptly and fully force the distal end of a steering lock pin in the receiver member through the aligned holes to secure the steering lock pin and aligned holes in fixed relation. Although not required to achieve connection therebetween, a quick-release safety pin can be used to further secure the coupler member and the receiver member to one another during tandem travel. Consequently, the present invention allows the child's bicycle to be operated as an independent unit, and when a child cycling with an adult becomes tired, the child's bicycle can be expediently attached to the adult bicycle for safe tandem use, without tools or the removal of bicycle parts, and promptly disconnected thereafter with minimal effort, to restore the child's bicycle into its independently operable condition whenever the child again wants to cycle alone, with such conversion being easily carried out multiple times on the same ride, if needed.

BACKGROUND ART

Cycling is a great exercise and a terrific family sport. Infant seats have been developed for adult bicycles, so that young children unable to operate a bicycle of their own can ride comfortably with an adult. However, problems occur with older children, typically ages 4–7, who want the independence of riding their own bicycle, yet do not possess the stamina and endurance to travel as far or as fast as an accompanying adult. To solve this problem bicycle tow bars have been developed that attach a child's bicycle in tandem behind an adult bicycle. The present invention steering lock improves the means of connection between the distal end of a bicycle tow bar and a child's bicycle by providing a connection that is accomplished in a quick and efficient step, with fewer parts, a simplified connection, and a more solid locking system during travel. Therefore, as a result of using the present invention, connection and disconnection of the child's bicycle can be efficiently accomplished multiple times on the same ride. In the towed position, the front wheel of the child's bicycle is slightly elevated and unable to engage the ground, so that the adult rider retains steering control. Also the child can optionally pedal or coast while being towed.

DISCLOSURE OF INVENTION

The primary object of this invention is to provide a solid connection between the distal end of a bicycle tow bar and the head tube of a child's bicycle, while also preventing rotation of the steering fork tube and the handlebar stem tube on the child's bicycle during tandem travel. It is a further object of this invention to provide a means of connection between the distal end of a bicycle tow bar and the head tube of a child's bicycle that can be accomplished in one quick, efficient connection step, requires no hand tools, and does not involve the removal of any parts from either bicycle. It is also an object of this invention to provide a means of connection between the distal end of a bicycle tow bar and the head tube of a child's bicycle that is simple in construction for cost-effective manufacture and case of use. A further object of this invention is to provide a means of connection between the distal end of a bicycle tow bar and the head tube of a child's bicycle that is made from durable materials for long-lasting use. It is also an object of this invention to provide a means of connection between the distal end of a bicycle tow bar and the head tube of a child's bicycle that is adaptable to installation during manufacture of the child's bicycle, as well as after-market installation.

As described herein, properly manufactured and installed, the present invention bicycle steering lock would enable quick and easy connection of a child's bicycle in tandem behind an adult bicycle with a bicycle tow bar, at anytime a child riding with an adult becomes tired and no longer is able to keep pace with the adult. A receiver member with a depressible steering lock pin is either attached to, or molded into so as to be an integral part thereof, the head tube of the child's bicycle. An optional receiver ear and an optional safety pin hole in the receiver member can also assist in providing a fast and solid connection between the receiver member and a coupler member with corresponding features. Thus, when the bottom portions of the coupler and receiver members each have at least one comparably positioned ear, the ears are in contact with one another, and the front surface of the steering fork tube on the child's bicycle is also in the forward position required to orient its front wheel longitudinally and align correlating holes in the front surfaces of the head tube, the steering fork tube, and the handlebar stem tube of the child's bicycle, a simple forward tilting of the upper portion of the coupler member toward the receiver member while using the joined ears as a pivot point, until the coupler member is in full contact with the receiver member and any safety in holes become aligned, forces the locking pin in the receiver member to become inserted into the correlating holes and maintain the locking pin and the correlating holes in fixed relation to one another until the steering lock pin is withdrawn. If safety pin holes are used, a quick-release safety pin can then be inserted through the aligned safety pin holes to further secure the receiver and coupler members in a fixed position relative to one another during tandem travel of the adult and child bicycles. Thus, the present invention is easy to use, with connection between the distal end of a bicycle tow bar and the head tube of a child's bicycle being accomplished in a quick and efficient connection step. When no ears are used, the steps of aligning the coupler and receiver members and fully inserting the locking pin within the correlating holes can still be promptly accomplished. Once connection between the coupler member and the receiver member is made, further rotation of the head tube, steering fork tube and handlebar stem tube on the child's bicycle relative to one another is prevented, with the front wheel of the child's bicycle being slightly elevated and unable to engage the ground so that the adult rider retains steering control. The child can optionally pedal or coast while being towed. Further, no hand tools are required to make or separate the present invention connection between the adult and child bicycles, and no parts are removed from either the adult of child's bicycle during disconnection. Removal of the bicycle tow bar from the child's bicycle requires only the withdrawal of the quick-release safety pin from the safety pin holes in the coupler and receiver members, when used, followed by prompt lifting away of the coupler member from the receiver member. Since the present invention connection between an adult bicycle and a child's bicycle can be rapidly made and promptly terminated, the child's bicycle can be repeatedly towed by the adult bicycle and restored to independent use multiple times during travel. It is contemplated for the preferred embodiment of the present invention to be made from high-strength steel for strong, durable construction. The simple design of the present invention, its few parts, as well as the configuration of the receiver and coupler members, also enhance durability and cost-effective manufacture of the present invention. The receiver member is also simple in design, having a configuration that allows alternative means of attachment to a child's bicycle, either as a result of being formed as an integral part of head tube construction, connected to the head tube during manufacture, or after market connection to the head tube of a previously constructed child's bicycle.

The description herein provides the preferred embodiments of the present invention but should not be construed as limiting the scope of the automatic bicycle steering lock invention. For example, variations in the length, width, and thickness dimensions of the coupler and receiver members; the diameter dimension of any safety pin holes used; the use of receiver and coupler ears, and the size and configuration of any receiver and coupler ears used; the length and diameter dimension of the locking pin, the material from which the return spring associated with the locking pin is made; and the configuration of any quick-release safety pin used; other than those shown and described herein may be incorporated into the present invention. Thus the scope of the present invention should be determined by the appended claims and their legal equivalents, rather than being limited to the examples given.

BEST MODES FOR CARRYING OUT THE INVENTION

Figure 1:
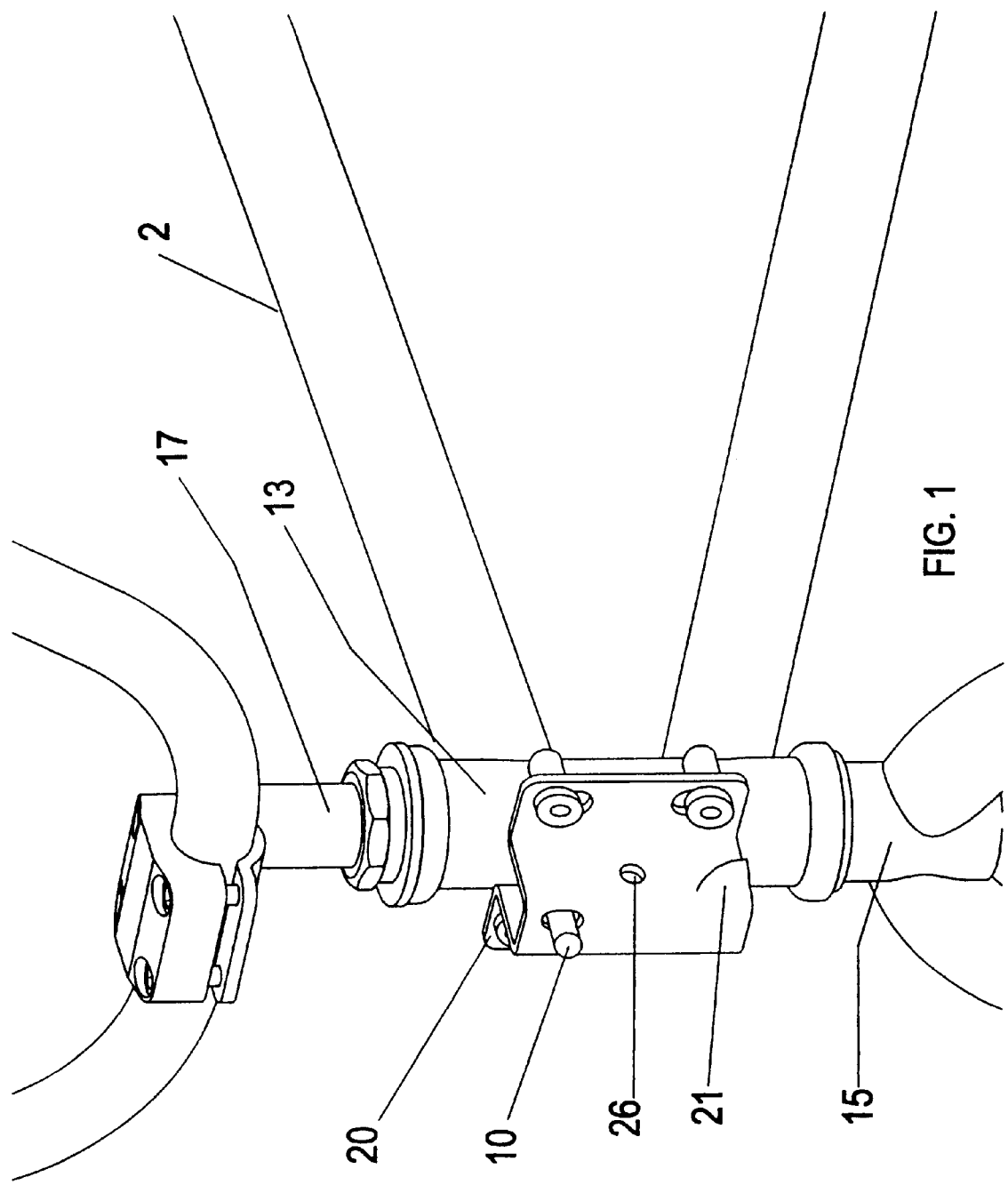
FIG. 1 is a perspective view of the receiver member in a first preferred embodiment of the present invention attached to the head tube of a child's bicycle, the receiver member having an exposed front surface and a steering lock pin, and being in an unlocked position with one end of its steering lock pin extending beyond its exposed front surface.

The present invention comprises a receiver component, such as receiver member 20 or a pivot receiver 30, attached to the head tube 13 of a child's bicycle 2 and a coupler member 22 that depends from the distal end of a bicycle tow bar 24 connected to a larger adult bicycle 4, so that when coupler member 22 is fully joined to receiver member 20 or pivot receiver 30, the adult bicycle 4 can safely tow the child's bicycle 2. In its attached tandem position, the front wheel 6 of the child's bicycle 2 is preferably elevated and unable to engage the ground so that the rider (not shown) of the adult bicycle 4 maintains steering control. Although not shown, the child can optionally pedal or coast while being towed. Connection between receiver member 20, or pivot receiver 30, and coupler member 22 is rapidly made. Coupler member 22 is first attached to the distal end of tow bar 24, while receiver member 20 or pivot receiver 30 is connected to the head tube 13 of the child's bicycle 2. The optional coupler ear 23 on the bottom portion of coupler 22, when present, is then aligned with the optional receiver ear 21 on the bottom portion of either receiver member 20 or pivot receiver 30 for male/female connection, with the front wheel 6 of the child's bicycle 2 concurrently being placed into a longitudinal orientation required for the hole 16 in the front surface of steering fork tube 15 on the child's bicycle 2 to become aligned with hole 14 in head tube 13, hole 18 in handlebar stem tube 17, and the interior end of the steering lock pin 10 exposed through the front surface of receiver member 20 or pivot receiver 30. Particularly when optional ears 21 and 23 and optional safety pin holes 26 and 27 are used, the upper portion of coupler member 22 is then rotated rearwardly toward receiver member 20 or pivot receiver 30 using joined ears 21 and 23 as a pivot point, until coupler member 22 is in full contact with receiver member 20 or pivot receiver 30 and opposing transversely positioned safety pin holes 27 in coupler member 22 become aligned with corresponding transversely positioned safety pin holes 26 in either receiver member 20 or pivot receiver 30. Once coupler member 22 achieves its position of full engagement with receiver member 20 or pivot receiver 30, the interior end of steering lock pin 10 is fully forced through the previously aligned head tube steering lock pin hole 14, steering fork tube hole 16, and handlebar stem tube hole 18. Then, to further secure coupler member 22 against receiver member 20 or pivot receiver 30 while adult bicycle 4 tows child's bicycle 2, a quick-release safety pin 25 can be inserted through opposing safety pin holes 26 in either receiver member 20 or pivot receiver 30, as well as opposing safety pin holes 27 in coupler member 22, even though quick-release safety pin 25 is not required to force the hidden end of steering lock pin 10 into head tube steering lock pin hole 14, steering fork tube hole 16, and handlebar stem tube hole 18 in the child's bicycle 2. Thus, the present invention allows child's bicycle to be operated as an independent unit, and when a child (not shown) cycling with an adult becomes tired, child's bicycle 2 can be promptly attached without tools, and without any parts being removed therefrom, to adult bicycle 4 for tandem use as long as needed, and then readily disconnected with minimal effort thereafter to restore child's bicycle 2 into its independently operable condition. After release of child's bicycle 2 from adult bicycle 4 and if required, bicycle tow bar 24 can be again secured against adult bicycle 4 in an out-of-the-way position. Pivot receiver 30 allows prompt and easy adjustment of the angle of the child's bicycle 2 relative to the adult bicycle 4 while in tandem connection. However, although not as promptly accomplished and not shown in FIGS. 1–12, angle adjustment of a child's bicycle 2 relative to an adult bicycle 4 while in tandem connection can still be achieved with receiver member 20 through the use of shims.

FIG. 1 shows the receiver member 20 in a first preferred embodiment of the present invention attached to the head tube 13 of a child's bicycle 2. Three out of four fastener connections 35 are shown securing receiver member 20 to the vertically extending head tube 13 on the child's bicycle 2. Receiver member 20 has a substantially U-shaped configuration, which is flanged to provide an attachment surface through which fastener connection 35 can be secured. FIG. 1 also shows an ear 21 protruding outwardly from the bottom front portion of receiver member 20. Although not shown and not critical to the present invention, it is preferred that a similar ear 21 would be formed into the hidden side of receiver member 20. FIG. 1 further shows one quick-release safety pin hole 26 transversely through the central portion of receiver member 20. Although not shown, it is contemplated for an opposing quick-release safety pin hole 26 to be transversely formed through the hidden side of receiver member 20. Both quick-release safety pin holes 26, when optionally used, would be configured slightly larger than the diameter dimension of the quick-release safety pin 25 intended for use therewith so that prompt and easy insertion, and removal, of quick-release safety pin 25 can occur. However, quick-release safety pin holes 26 would not be so large as to allow a lot of lateral movement of quick-release safety pin 25 while in its operational position. In addition, FIG. 1 shows handlebar stem tube 17 being positioned concentric within steering fork tube 15, and steering fork tube 15 concentrically positioned within head tube 13. Although the exposed end of steering lock pin 10 extends beyond the exposed front surface of receiver member 20 in an unlocked position, FIG. 1 shows handlebar stem tube 17 in an aligned position ready for locking by the coupler member 22 shown in FIG. 2. It is contemplated for receiver member 20 to be made from strong, durable, and weatherproof materials for long lasting use, such as but not limited to high-strength steel. The length dimension, diameter dimension, and configuration of steering lock pin 10 are not critical. However, the size and configuration of steering lock pin 10 should be appropriate to cost efficient manufacture and use.

Figure 2:
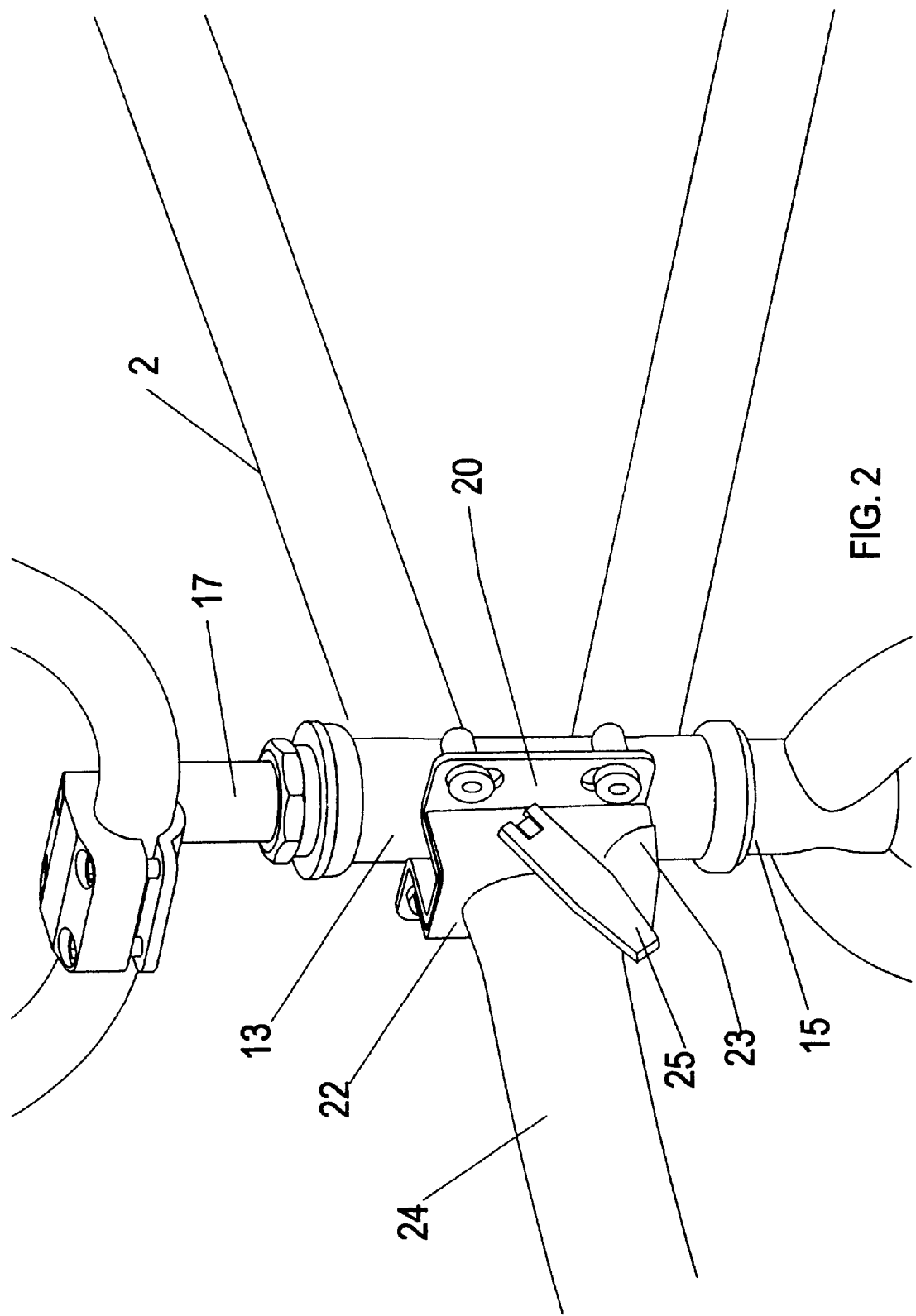
FIG. 2 is a perspective view of the first preferred embodiment with the receiver member attached to the head tube of a child's bicycle, a coupler member depending from the distal end of a bicycle tow bar being attached to the receiver member so as to fully engage its steering lock pin, and a quick-release safety pin securing the coupler member in a fixed position against the receiver member.
Figure 4:
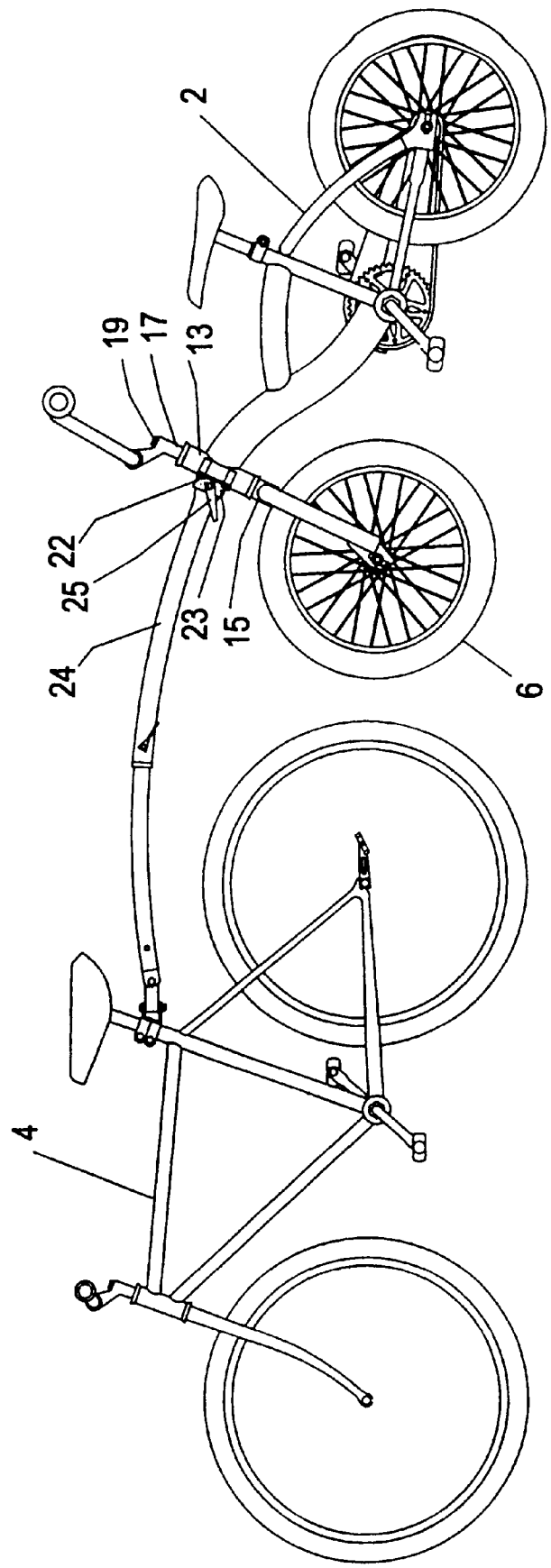
FIG. 4 is a right side view of the first preferred embodiment being used to tow a child's bicycle in tandem behind an adult bicycle, with the front wheel of the child's bicycle being slightly raised and a quick-release safety pin secured in its operational position.
Figure 5:
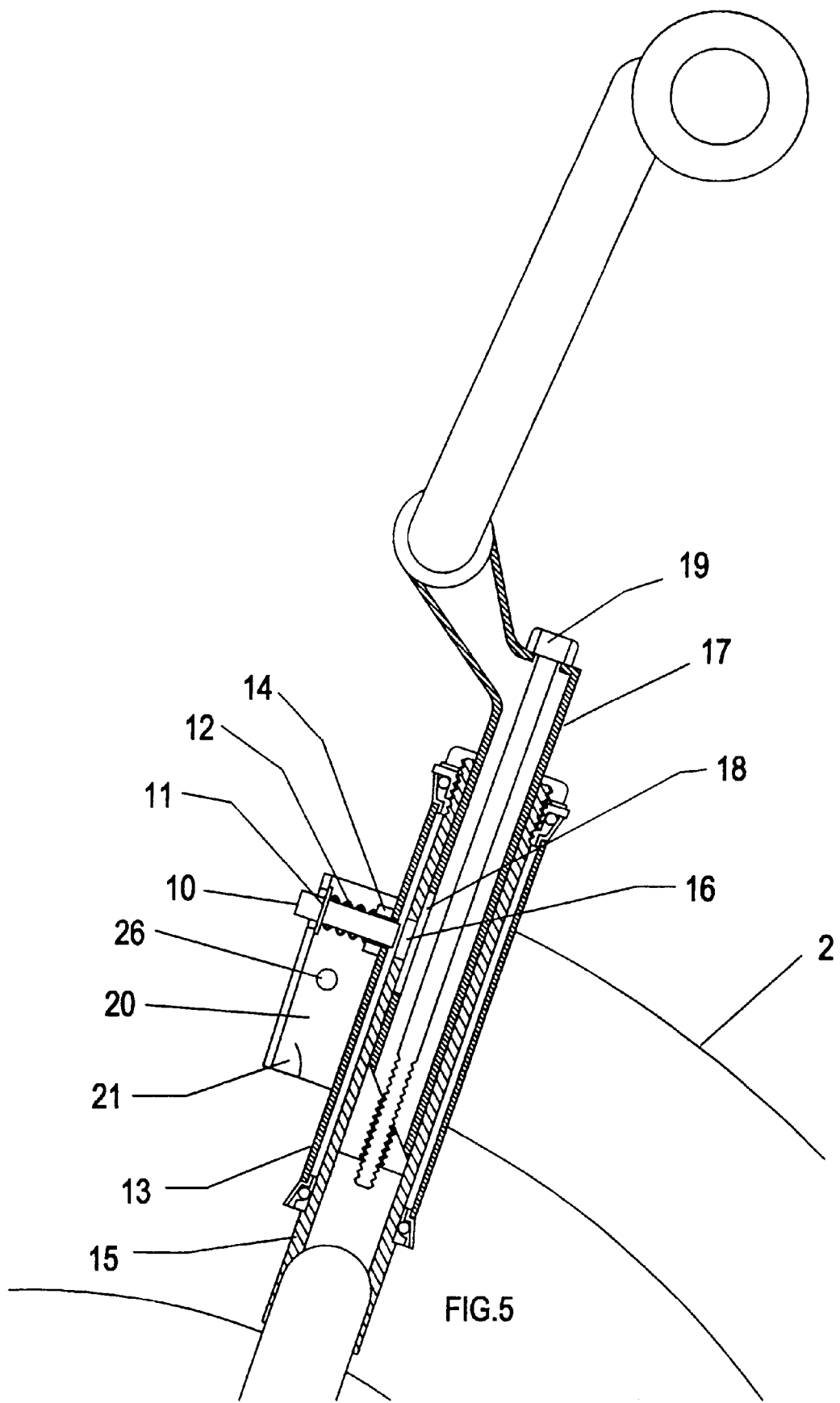
FIG. 5 is a cross-sectional side view of the receiver member in the first preferred embodiment attached to the head tube of a child's bicycle, with one end of its steering lock pin extending beyond the exposed front surface of the receiver member in an unlocked position.

FIG. 2 shows a coupler member 22 depending from the distal end of a bicycle tow bar 24 and being connected to the receiver member 20 in the first preferred embodiment of the present invention, and further being secured to receiver member 20 with a quick-release safety pin 25. For tandem connection of the child's bicycle 2 to an adult bicycle 4, as shown in FIG. 4, and although not critical, it is preferred for bicycle tow bar 24 to be telescoping or otherwise extendable, and for its proximal end to be connected to adult bicycle 4 in an out-of-the-way position. Receiver member 20 is attached to the vertically extending head tube 13 of a child's bicycle 2, within which steering fork tube 15 and handlebar stem tube 17 are concentrically positioned. Quick-release safety pin 25 further secures coupler member 22 in a fixed position relative to receiver member 20, although its use is not required for locking connection of receiver member 20 and coupler member 22, or fixed positioning of head tube 13, steering fork tube 15, and handlebar stem tube 17 relative to one another. The configuration of quick-release safety pin 25 is not critical, as long as it can be easy grasped by a human adult hand for prompt insertion and withdrawal from quick-release safety pin holes 26 and 27. Also, although the number of quick-release safety pins 25 used is not critical, for simplicity and cost efficient design, one quick-release safety pin 25 is preferred. FIG. 2 also shows three out of four fastener connections 35 used to secure receiver member 20 to head tube 13, which remain exposed when coupler member 22 is in its fully engaged position against receiver member 20. Coupler member 22 has a substantially U-shaped and non-flanged configuration, as opposed to the U-shaped and flanged configuration of receiver member 20. FIG. 2 also shows optional ear 23 protruding outwardly from the bottom front portion of coupler member 20. Although not shown and not critical, it is preferred that a similar ear 23 would be formed into the hidden side of coupler member 20. The presence of a second ear 23 on the hidden side of coupler member 22, would be determined by the existence of a second ear 21 on receiver member 20, with the number and configuration of ears 23 closely approximating that of ears 21, so that ears 21 and 23 can together act as a guide for prompt alignment of coupler member 22 into its fully engaged position against the vertically extending front surface of receiver member 20. In such a fully engaged position, coupler member 22 would push on the exposed end of steering lock pin 10 and cause the opposing interior end of steering lock pin 10 to become successively inserted through aligned holes (not shown in FIG. 2) in the front surfaces of concentrically positioned head tube 13, steering fork tube 15, and handlebar stem tube 17. FIG. 2 also shows handlebar stem tube 17 in its aligned position ready for locking by coupler member 22 and steering lock pin 10.

Figure 3:
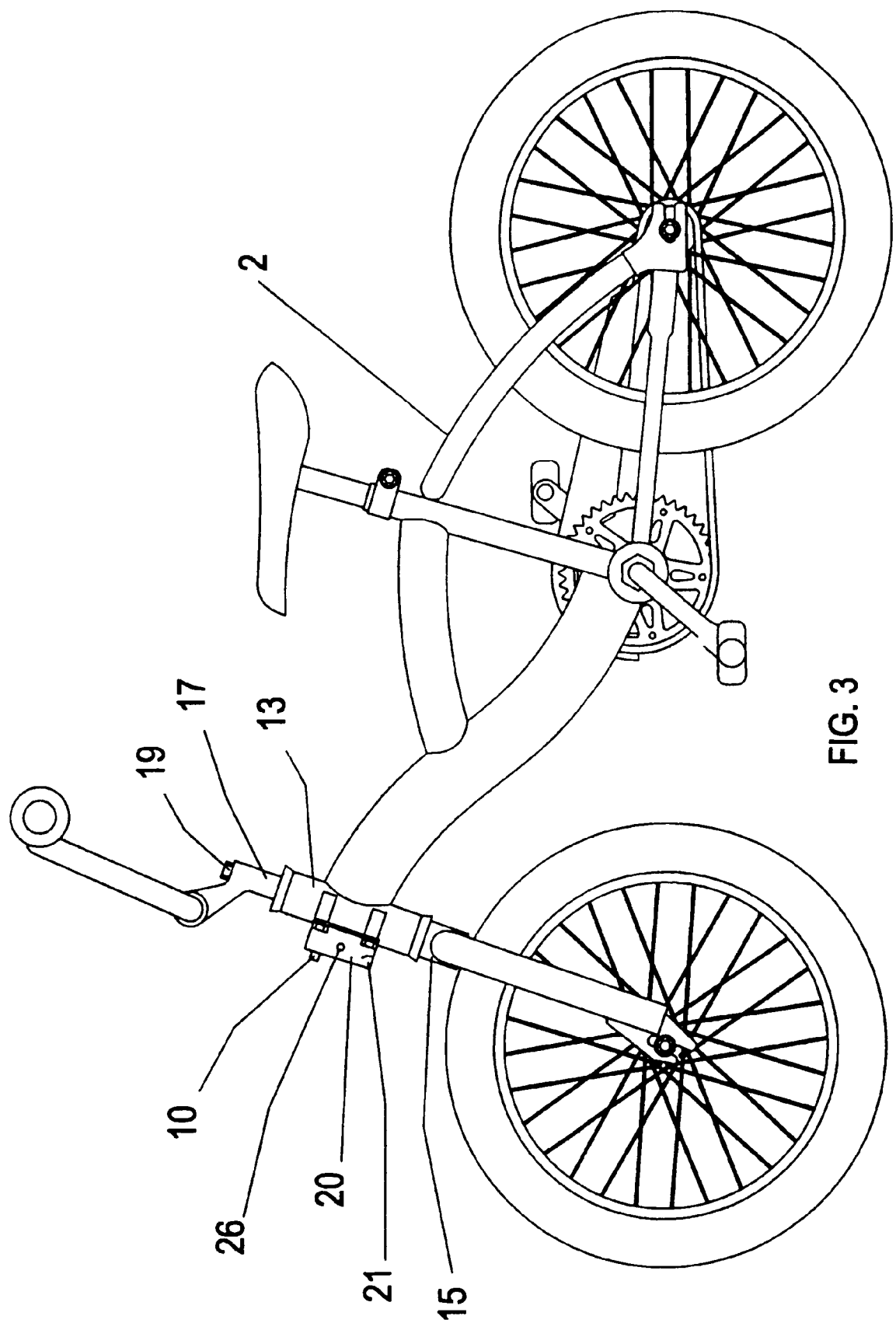
FIG. 3 is a right side view of a child's bicycle outfitted with the receiver member of the first preferred embodiment of the present invention.

FIG. 3 shows a child's bicycle 2 outfitted with receiver member 20 of the first preferred embodiment of the present invention. Receiver member 20 is attached to the exposed front surface of head tube 13 and shown in its unlocked position with steering lock pin 10 extending beyond the front surface of head tube 13. Handlebar steering tube 17 is secured within steering fork tube 15 with handlebar stem lock bolt 19, and prior to connection of coupler member 22 to receiver member 20 handlebar steering tube 17 must be positioned in an orientation that causes the front wheel 6 of child's bicycle 2 to be longitudinally directed. FIG. 3 also shows receiver member 20 having an optional quick-release safety pin hole 26 and an optional receiver ear 21, with ear 21 assisting in fast engagement of coupler member 22 to receiver member 20 and safety pin hole 26 providing a further means for securing coupler member 22 to receiver member 20 once they are engaged. Although a second receiver ear 21 is not critical, it is preferred that the present invention have opposing quick-release safety pin holes 26, as well as opposing receiver ears 21.

FIG. 4 shows the first preferred embodiment of the present invention being used with the distal end of a bicycle tow bar 24 to safely tow a child's bicycle 2 in tandem behind an adult bicycle 4, with the front wheel 6 of the child's bicycle 2 being slightly elevated and an optional quick-release safety pin 25 in its operational position. Bicycle tow bar 24 can be fixed in length, foldable, telescoping, or otherwise extendable, as long as it becomes fixed in length during tandem use between child's bicycle and adult bicycle 4. When separated from child's bicycle 2, bicycle tow bar 24 can be returned to its stored position on adult bicycle 4. Since coupler member 22 is in its engaged position against receiver member 20, only coupler member 22 with its coupler ear 23 is visible to a viewer. FIG. 4 also shows optional quick-release safety pin 25 connected transversely through the central portion of coupler member 22. Fastener connections 35 hold receiver member 20 tight against the vertically extending exposed front surface of head tube 13 on child's bicycle 2, although receiver member 20 is difficult to distinguish in FIG. 4 due to its relatively small size and thin width dimension. FIG. 4 further shows handlebar stem lock bolt 19 secured to the top end of handlebar stem tube 17, as well as handlebar stem tube 17 and steering fork tube 15 both extending beyond opposite ends of the vertically oriented head tube 13. For connection of coupler member 22 and receiver member 20, handlebar stem tube 17 must be in a position allowing longitudinal orientation of front wheel 6 on child's bicycle 2.

Figure 6:
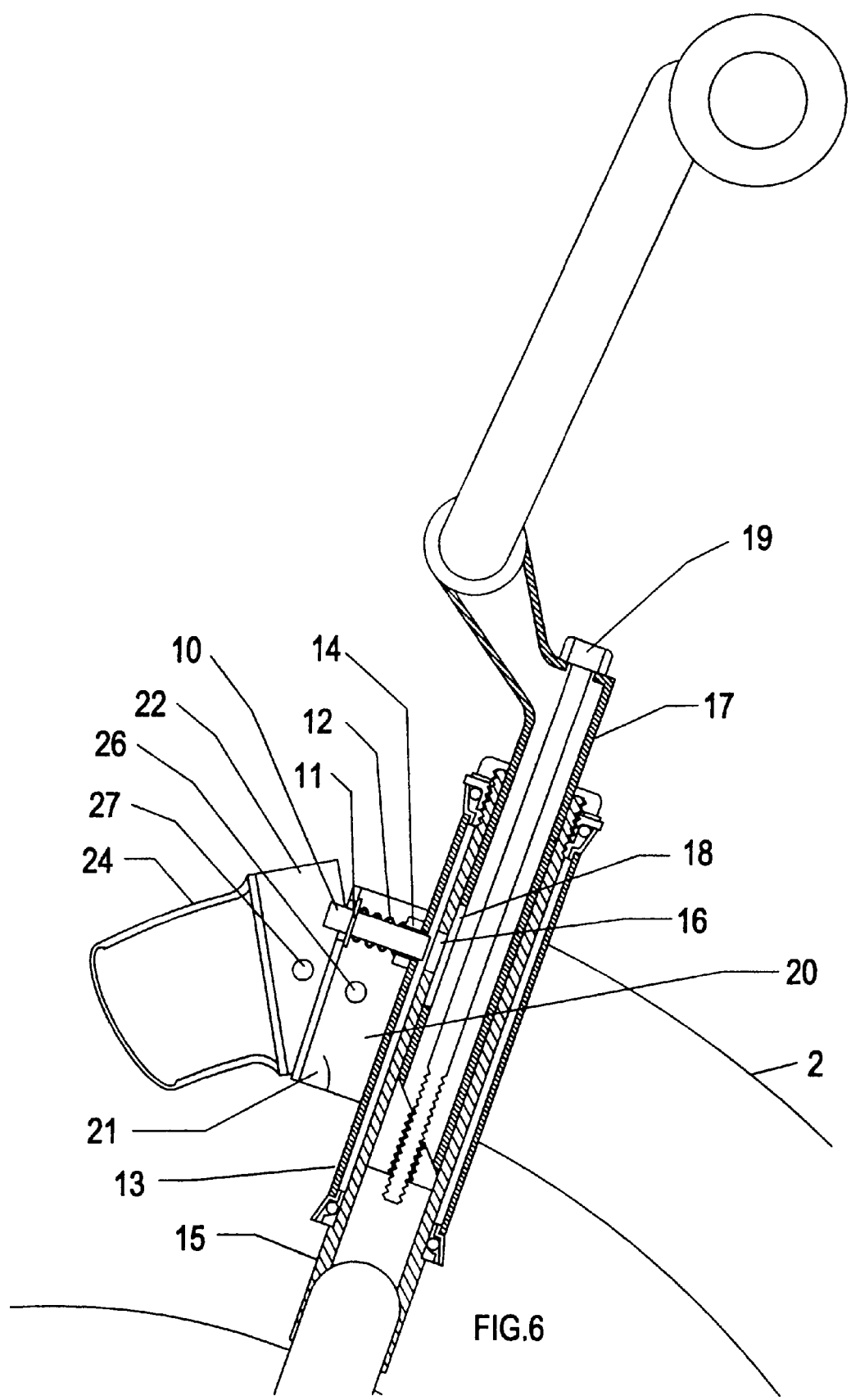
FIG. 6 is a cross-sectional side view of the receiver member in the first preferred embodiment of the present invention attached to the head tube of a child's bicycle and a coupler member partially engaged with the receiver member, with the ears of the coupler and receiver members being aligned prior to engagement of the steering lock pin.
Figure 7:
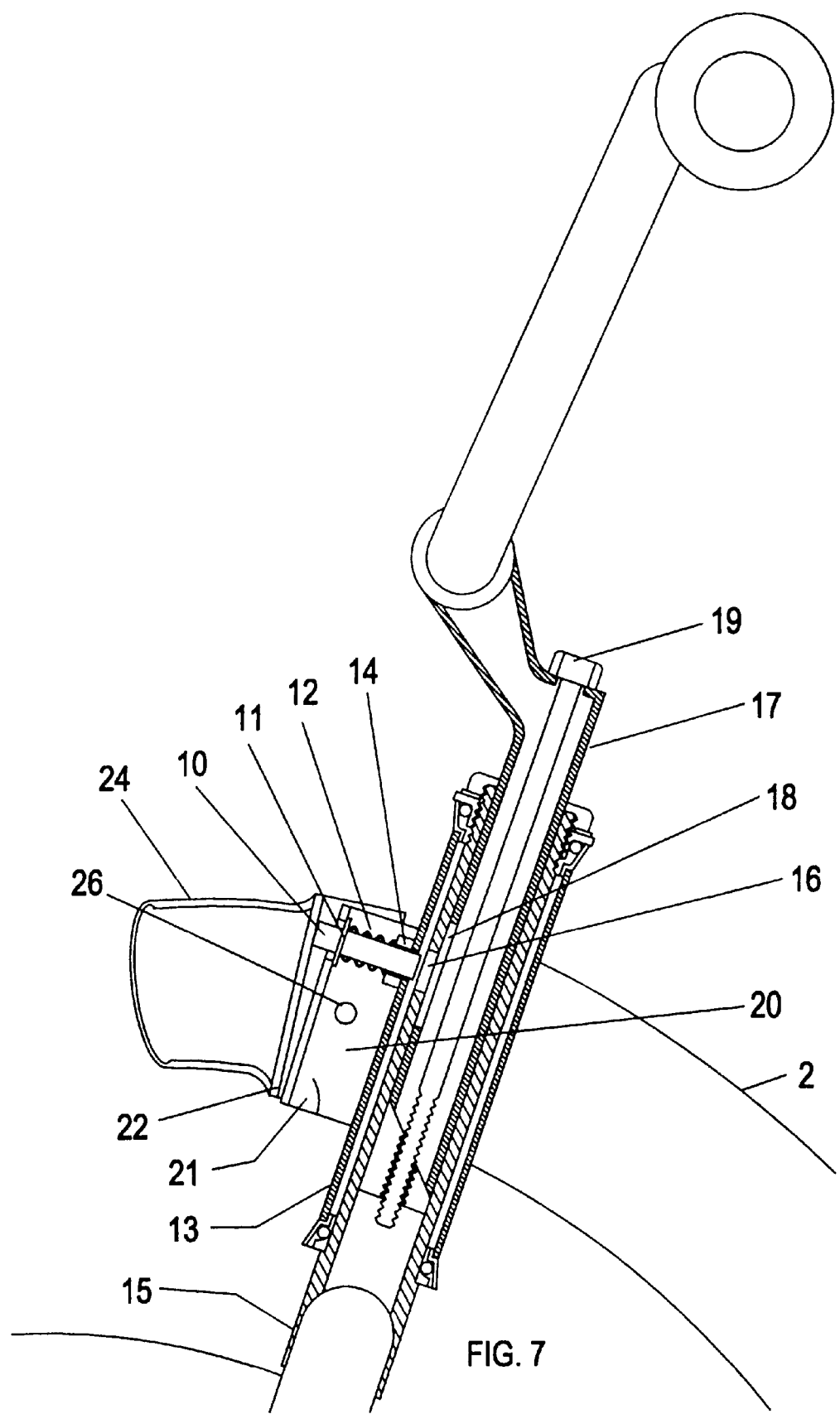
FIG. 7 is a cross-sectional side view of the receiver member in the first preferred embodiment attached to the head tube of a child's bicycle and a coupler member close to its position of full engagement with the receiver member, with the ears of the coupler and receiver members being aligned and the coupler member ready to engage the steering lock pin on the receiver member.
Figure 8:
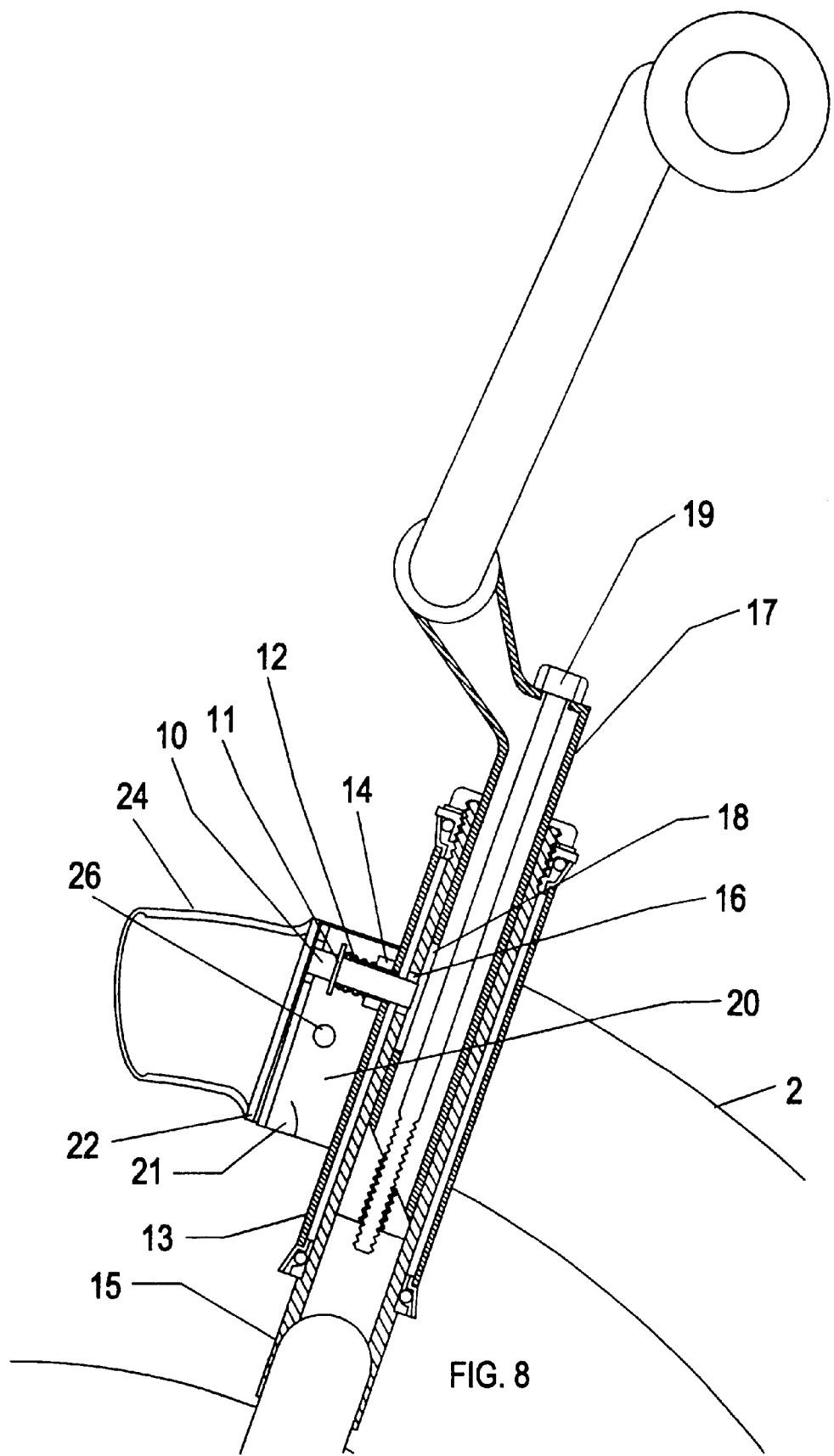
FIG. 8 is a cross-sectional side view of the receiver member in the first preferred embodiment attached to the head tube of a child's bicycle and a coupler member engaged with the receiver member, with the ears of the coupler and receiver members aligned and the coupler member fully engaging the steering lock pin.

FIGS. 6–8 show coupler member 22 being progressively attached to receiver member 20 attached to the head tube 13 of a child's bicycle 2, and being in an unlocked position with one end of its steering lock pin 10 extending beyond the exposed front surface of receiver member 20, ready for engagement with coupler member 22. FIGS. 6–8 show coupler member 20 depending from the distal end of bicycle tow bar 24 and in various stages of engagement with receiver member 20. FIG. 6 shows coupler member 22 partially engaged with receiver member 20, with the quick-release safety pin hole 27 of coupler member 22 and the quick-release safety pin hole 26 of receiver member 20 not yet being aligned, prior to the forward rotation of the upper end of coupler member 22 toward receiver member 20 that would cause engagement of coupler member 22 with the exposed end of steering lock pin 10 and result in the insertion of the interior end of steering lock pin 10 through head tube steering lock pin hole 14, steering fork tube hole 16, and optionally handlebar stem tube hole 18. FIG. 7 shows coupler member 22 further engaged with receiver member 20, with the quick-release safety pin hole 27 of coupler member 22 no longer visible, and preliminary engagement of the upper end of coupler member 22 with the exposed end of steering lock pin 10. FIG. 8 shows coupler member 22 fully engaged with receiver member 20 and the interior end of steering lock pin 10 being inserted through steering fork tube hole 16. FIGS. 5–8 each show handlebar stem tube 17 concentrically secured within steering fork tube 15 by handlebar stem lock bolt 19, as well as head tube 13 concentrically positioned around steering fork tube 15. The inner end of steering lock pin 10 is inserted through head tube steering lock pin hole 14 and poised for insertion through steering fork tube hole 16 in steering fork tube 15, and the aligned handlebar stem tube hole 18 in handlebar stem tube 17. Prior to locked engagement of coupler member 22 with receiver member 20, handlebar stem tube 17 must be purposefully aligned so that its handlebar stem tube hole 18 is in a proper orientation for insertion therethrough of the interior end of steering lock pin 10. In this aligned orientation, the position of the front wheel 6 of child's bicycle 2 would become longitudinally directed. FIGS. 5–8 also show steering lock pin stop 11 and steering lock pin return spring 12, used to disengage the interior end of steering lock pin 10 from steering fork tube hole 16 and handlebar stem tube hole 18, after optional quick-release safety pin 25 is withdrawn from quick-release safety pin holes 26 and 27, allowing for separation of coupler member 22 from receiver member 20 when desired. FIGS. 5–8 further show receiver member 20 having an optional ear 21 that assists in establishing a prompt between coupler member 22 and receiver member 20, and optional quick-release safety pin receiver hole 26 for use with the quick release safety pin 25 (shown in FIG. 2) to further secure coupler member 22 against receiver member 20 once steering lock pin 10 has been inserted through steering fork tube hole 16 and handlebar stem tube hole 18. Since FIGS. 5–8 are sectional views, they do not show coupler ear 23 being aligned with receiver ear 21, or the fastener connections 35 shown in FIGS. 1 and 2 that are used to secure receiver member 20 to vertically extending head tube 13 on child's bicycle 2.

Figure 9:
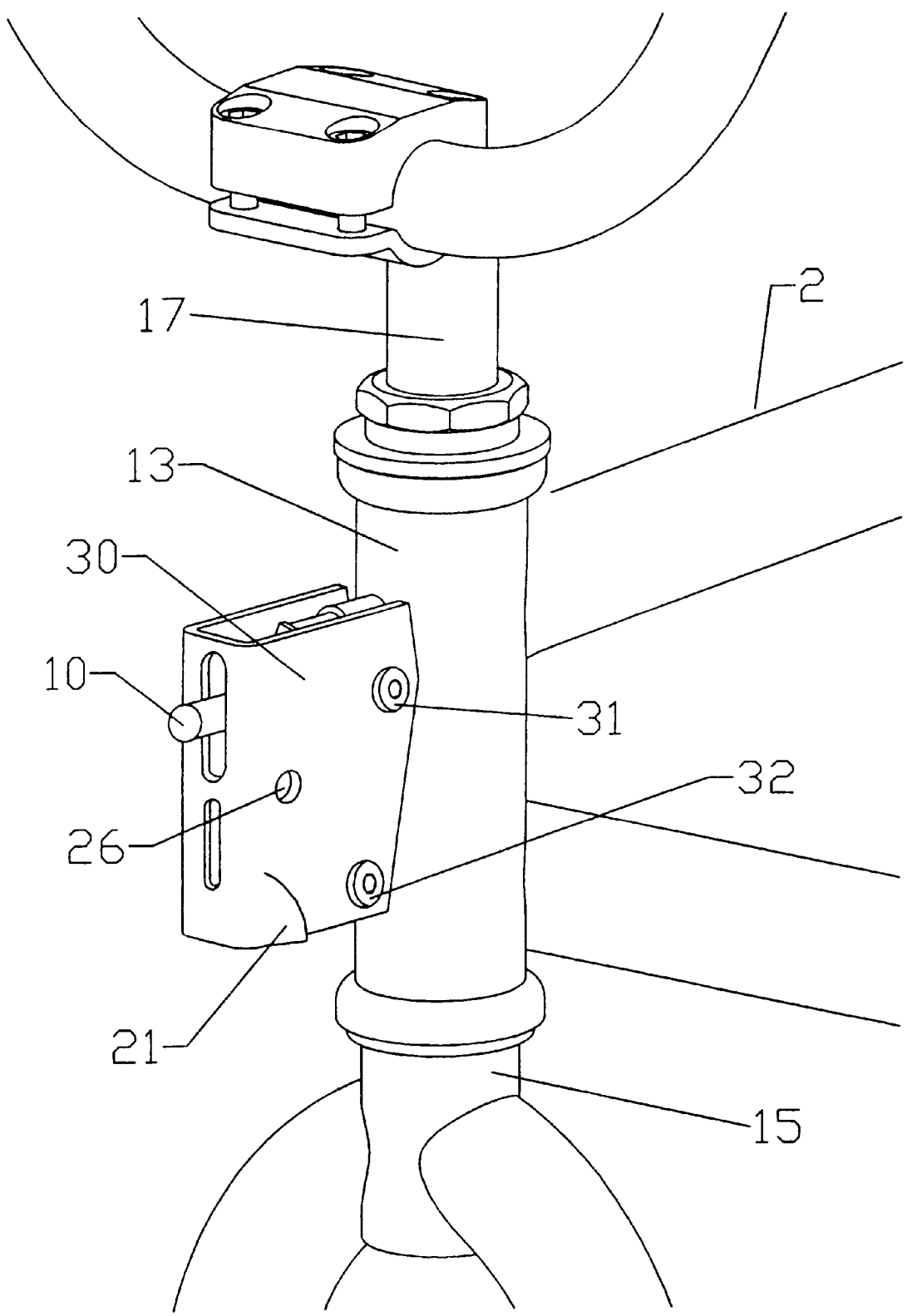
FIG. 9 is a perspective view of a second preferred embodiment of the present invention having a pivot receiver attached to the head tube of a child's bicycle, the front surface of the pivot receiver aligned substantially parallel with the front surface of the head tube, one end of a steering lock pin extending through an elongated vertically-extending aperture through the front surface of the pivot receiver, and the pivot receiver being secured to the head tube by a fixed pivot bolt and a slide pivot bolt.
Figure 10:
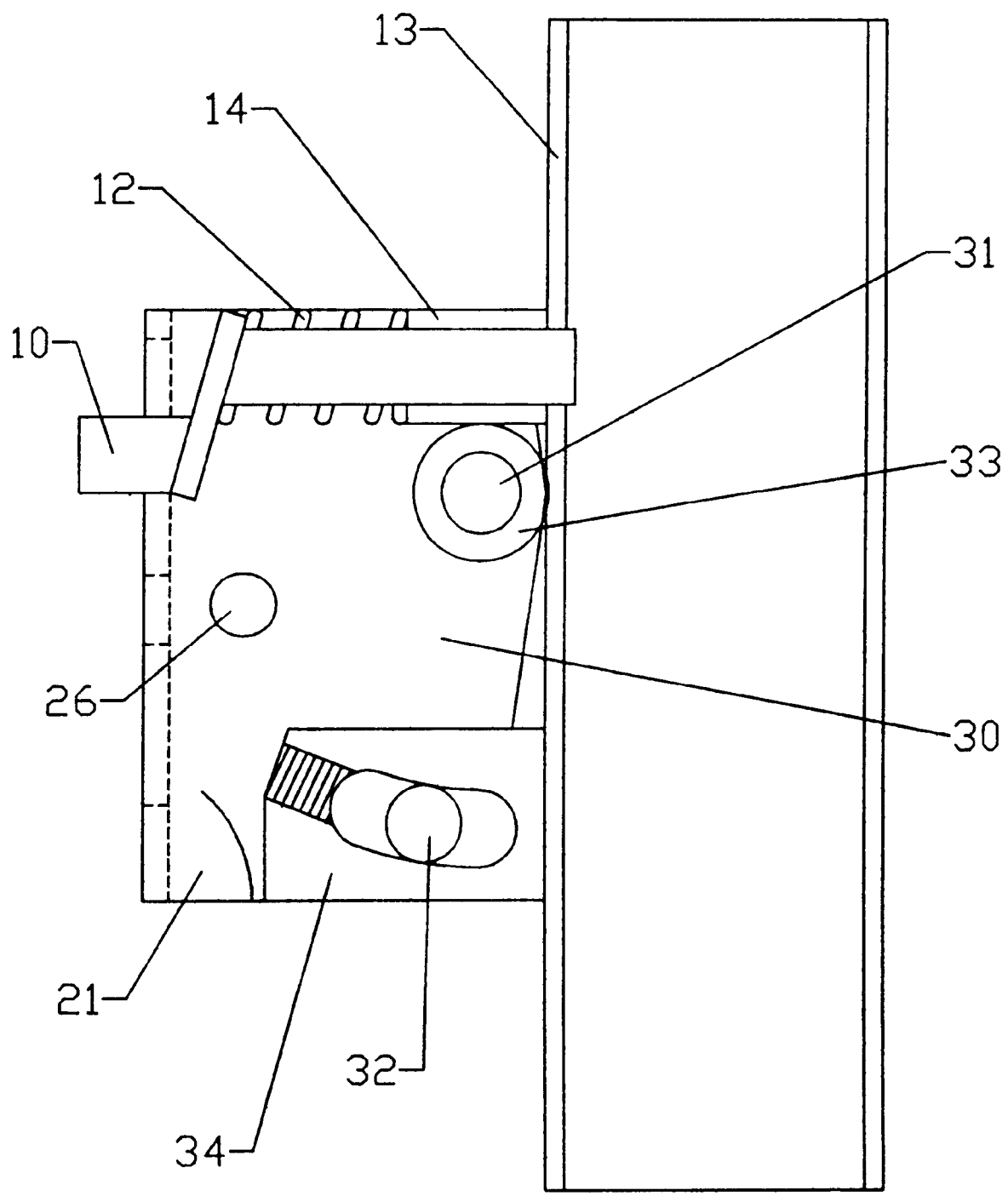
FIG. 10 is a cross-sectional side view of the second preferred embodiment with the front surface of the pivot receiver in a position substantially parallel to the front surface of the head tube of the child's bicycle, one end of a steering lock pin extending through the front surface of the pivot receiver with the opposing end of the steering lock pin poised for extension into the head tube, the pivot receiver being held in place against the head tube by a fixed pivot bolt and a slide pivot bolt.
Figure 11:
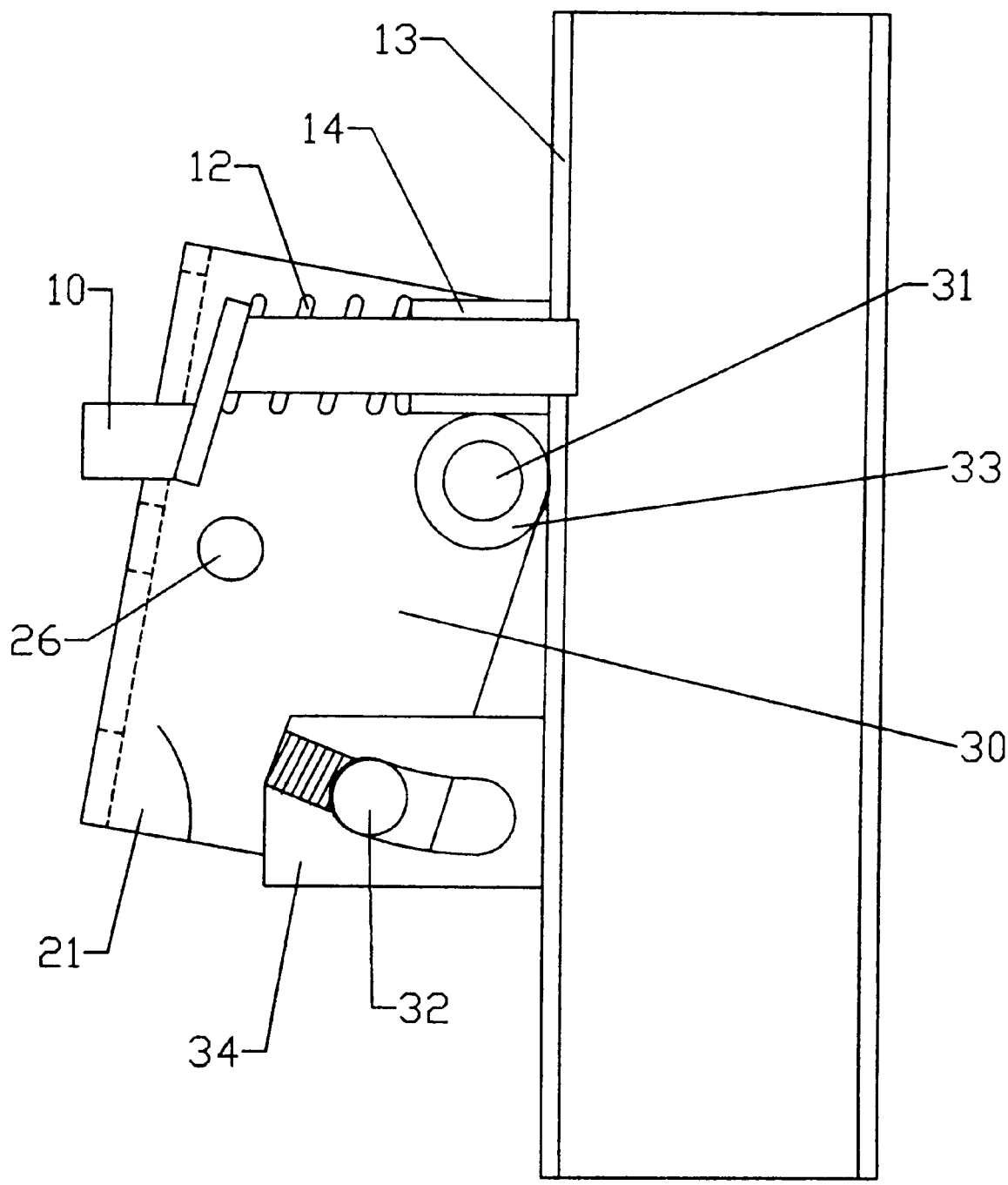
FIG. 11 is a cross-sectional side view of the second preferred embodiment of the present invention with the front surface of the pivot receiver attached to the head tube of a child's bicycle in a non-parallel, up position.
Figure 12:
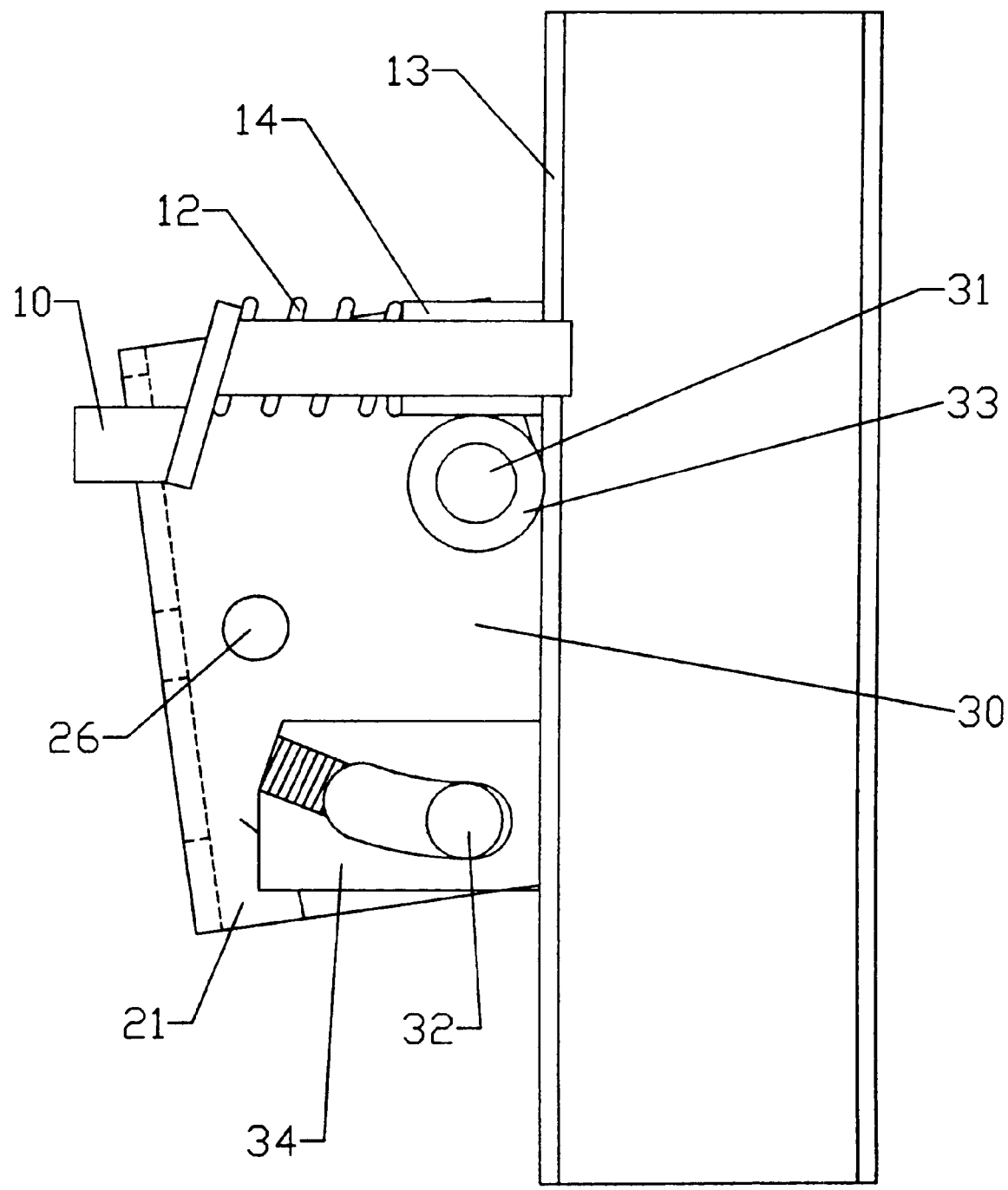
FIG. 12 is a cross-sectional side view of the second preferred embodiment of the present invention with the front surface of the pivot receiver attached to the head tube of a child's bicycle in a non-parallel, down position.

FIGS. 9–12 shows a second preferred embodiment of the present invention having a pivot receiver 30 attached to the front surface of the head tube 13 of a child's bicycle 2 in place of receiver member 20, with one end of a steering lock pin 10 protruding through the exposed front surface of pivot receiver 30. Although not shown and not critical, pivot receiver 30 can be connected to head tube 13 through use of any type of mounting hardware that creates a single pivot point between them. Pivot receiver 30 allows for fast and easy vertical adjustment of the raised position for the front wheel 6 on child's bicycle 2 while it is being towed by adult bicycle 4. Vertical adjustment of front wheel 6 with receiver member 20 is also possible, but would require the use of shims (not shown). Vertical adjustment is typically performed on an infrequent basis, such as to provide adaptation for a new child's bicycle, a new child, or the existing child after significant growth. FIGS. 9 and 10 show the second preferred embodiment of the present invention having the front surface of pivot receiver 30 aligned parallel with the exposed front surface of head tube 13 of child's bicycle 2. In contrast, FIG. 11 shows the front surface of pivot receiver 30 attached to head tube 13 of child's bicycle 2 in a non-parallel, upwardly oriented position, and FIG. 12 shows the second preferred embodiment of the present invention with the front surface of pivot receiver 30 attached to head tube 13 of child's bicycle 2 in a non-parallel, downwardly oriented position. FIG. 9 further shows handlebar stem tube 17 concentrically positioned within steering fork tube 15, and head tube 13 concentrically positioned around steering fork tube 15. FIGS. 9–12 also show pivot receiver 30 having an optional receiver ear 21 for easy alignment of the bottom portion of coupler member 22, and an optional quick-release safety pin hole 26 transversely through the central portion of pivot receiver 30 below steering lock pin 10 for use with a quick-release safety pin 25 for further securing the connection between coupler member 22 and pivot receiver 30 while child's bicycle 2 is being towed. FIGS. 9–12 further show the central portion of pivot receiver 30 being secured to head tube 13 with a fixed pivot bolt 31 and the lower portion of pivot receiver 30 being secured to head tube 13 with a slide pivot bolt 32. What remains hidden in FIGS. 9–12 is the mounting bracket permanently attached to head tube 13 that provides the connection between pivot receiver 30 and head tube 13. The mounting bracket can have any convenient configuration that provides a secure connection between pivot receiver 30 and head tube 13, and is preferably welded to the front surface of head tube 13. FIGS. 10–12 also show steering lock pin 10 being connected to return spring 12 and the interior end of steering lock pin 10 being inserted through head tube steering lock pin hole 14, fixed pivot bolt 31 being connected to fixed pivot mount 33 and slide pivot bolt 32 being connected to slide pivot mount 34, with FIG. 10 showing slide pivot bolt 33 centered within slide pivot mount 34, FIG. 11 showing slide pivot bolt 33 within the front portion of slide pivot mount 34 whereby the front wheel 6 of child's bicycle 2 would be in a position of near maximum elevation while being towed, and FIG. 12 showing slide pivot bolt 33 within the rear portion of slide pivot mount 34 whereby the front wheel 6 of child's bicycle 2 would be in a position of near minimum elevation while being towed.

INDUSTRIAL APPLICABILITY

Families with children ages 4–7 are often left without adequate means for cycling together. Children this age are typically too large for riding in an infant seat connected to an adult bicycle, and yet they generally do not possess the stamina and endurance to travel as far or as fast as an accompanying adult. To solve this problem, bicycle tow bars have been developed that attach a child's bicycle in tandem behind an adult bicycle. The present invention steering lock improves the means of connection between the distal end of a bicycle tow bar and a child's bicycle by providing a connection that is accomplished in one quick and efficient step, with fewer parts, a simplified connection, no part being removed from the adult bicycle during connection, and a more solid locking system during tandem travel. Therefore, as a result of using the present invention, connection and disconnection of the child's bicycle can be efficiently accomplished multiple times on the same ride, and a child who is age 4–7 can enjoy some independence in riding his or her own bicycle. In the towed position, the front wheel of the child's bicycle can be elevated so that the adult rider retains steering control. Also, the child can optionally pedal or coast while being towed.

What is claimed is:

1. A steering lock connecting the head tube of a child's bicycle with the distal end of a bicycle tow bar attached to an adult bicycle, said steering lock characterized by:

coupler means adapted for attachment to the distal end of a bicycle tow bar connected to an adult bicycle;

receiver means adapted for attachment to the head tube of a child's bicycle, said receiver means also being adapted for close positioning against said coupler means, said receiver means comprising a steering lock pin adapted for longitudinal movement between locked and unlocked positions so that as said coupler means is mated to said receiver means, said coupler means causes said steering lock pin to move at once into said locked position wherein said steering lock pin becomes inserted through aligned holes formed into the respective front surfaces of at least the head tube and the steering fork tube of the child's bicycle, to lock one to the other in fixed relation for tandem travel of the adult bicycle and the child's bicycle until said coupler means and said receiver means are deliberately separated from one another, whereby said steering lock pin is promptly returned to said unlocked position and the child's bicycle is restored to independent operation.

2. The steering lock of claim 1 characterized by said coupler means and said receiver means each having at least one ear analogous to the other for male/female connection, with said ears adapted for guiding alignment of said coupler means to said receiver means.

3. The steering lock of claim 1 characterized by said coupler means and said receiver means each having correspondingly positioned safety pin holes laterally therethrough that are adapted for easy insertion, easy removal, and secure positioning of said safety pin means for additional security in maintaining said coupler means against said receiver means during tandem travel.

4. The steering lock of claim 1 characterized by said receiver means further comprising at least one fixed pivot bolt and at least one slide pivot bolt.

5. The steering lock of claim 1 characterized by said receiver means being selected from a group consisting of receiver members requiring shims for angle adjustment and pivot receivers.

6. The steering lock of claim 1 characterized by said coupler means comprising a non-flanged and substantially U-shaped coupler member, and further characterized by said receiver means comprising a receiver member that is substantially U-shaped and flanged.

7. The steering lock of claim 1 characterized by said receiver member further comprising a return spring connected to said steering lock pin that is adapted for returning said steering lock pin to said unlocked position after said coupler member is drawn away from said receiver member for independent operation of the child's bicycle.

8. A steering lock used for rapid connection and disconnection between the head tube of a child's bicycle and the distal end of a bicycle tow bar attached to an adult bicycle, which allows safe towing of the child's bicycle behind the adult bicycle in a tandem configuration and elevated positioning of the front wheel of the child's bicycle while it is being towed so that the rider of the adult bicycle retains steering control, said steering lock characterized by:

a coupler member adapted for attachment to the distal end of a bicycle tow bar connected to the adult bicycle; and a receiver member adapted for attachment to the head tube of a child's bicycle and close positioning against said coupler member, with said receiver member also comprising a steering lock pin adapted for longitudinal movement between locked and unlocked positions so that as said coupler member is mated to said receiver member, said coupler member causes said steering lock pin to move at once, in one quick and efficient step, into said locked position wherein said steering lock pin becomes inserted through aligned holes formed into the respective front surfaces of at least the head tube and steering fork tube of the child's bicycle to lock one to the other in fixed relation for safe tandem travel of the adult bicycle and the child's bicycle without the use of hand tools and without removal of any parts from either bicycle until said coupler member is deliberately drawn away from said receiver member, whereby said steering lock pin is promptly returned to said unlocked position and the child's bicycle is restored to independent operation.

9. The steering lock of claim 8 characterized by at least one quick-release safety pin, and further characterized by said coupler member and said receiver member each being adapted for receipt of said quick-release safety pin, so that when each said quick-release safety pin is properly mated to said coupler member and said receiver member, said coupler member is further secured against said receiver member during tandem travel.

10. The steering lock of claim 8 characterized by said coupler member and said receiver member each having at least one ear analogous to the other for male/female connection, with said ears being adapted for guiding alignment of said coupler member against said receiver member.

11. The steering lock of claim 10 characterized by said coupler member and said receiver member each having at least one correspondingly positioned safety pin hole transversly therethrough that is adapted for easy insertion, easy removal, and secure positioning of one said quick-release safety pin.

12. The steering lock of claim 8 characterized by said receiver member being connected to the head tube of a child's bicycle with at least one fixed pivot bolt and at least one slide pivot bolt.

13. The steering lock of claim 8 characterized by said coupler member being non-flanged and substantially U-shaped, and further characterized by said receiver member being flanged and substantially U-shaped.

14. The steering lock of claim 8 characterized by said receiver member further comprising a return spring connected to said steering lock pin that is adapted for returning said steering lock pin to said unlocked position after said coupler member is drawn away from said receiver member for independent operation of the child's bicycle.

15. A method for rapidly connecting and disconnecting of a child's bicycle from an adult bicycle for alternating tandem and independent operation of the child's bicycle, said method characterized by the steps of:

providing a child's bicycle with a front wheel, said child's bicycle also having a head tube and a steering fork tube each with a front surface with a hole through said front surface, an adult bicycle, a bicycle tow bar with a distal end, and a steering lock with a coupler member and a receiver member having a steering lock pin;

attaching said receiver member to said head tube on said child's bicycle so that said steering lock pin protrudes from said receiver member;

attaching said bicycle tow bar to said adult bicycle;

connecting said coupler member to said distal end of said bicycle tow bar;

aligning said holes in said head tube and said steering fork tube so as to place said front wheel of said child's in longitudinally directed position; and moving said coupler member into a position closely against said receiver member so that said coupler member causes said steering lock pin to become inserted through said holes in said head tube and said steering fork tube to lock one to the other in fixed relation for safe tandem travel of said child's bicycle behind said adult bicycle until said coupler member is deliberately drawn away from said receiver member for restoration of said child's bicycle to independent operation.

16. The method of claim 15 characterized by said coupler member and said receiver member each having at least one ear analogous to the other that is adapted for male/female connection, with said ears adapted for guiding alignment of said coupler member against said receiver member, and further characterized by a step of using said ears to align bottom portions of said coupler member and said receiver member, and a step of using said ears as a pivot point for forward rotation of said coupler member against said receiver member.

17. The method of claim 15 characterized by said steering lock further comprising a quick-release safety pin, and said coupler member and said receiver member each having correspondingly positioned safety pin holes transversely therethrough that are adapted for easy insertion, easy removal, and secure positioning of said quick-release safety pin.

18. The method of claim 15 characterized by a step of providing at least one fixed pivot bolt and at least one slide pivot bolt, and a step of using each said fixed pivot bolt and each said slide pivot bolt to connect said receiver member to said head tube of said child's bicycle.

19. The method of claim 15 characterized by said coupler member and said receiver member both being substantially U-shaped, and further characterized by said receiver member also being flanged.

20. The method of claim 15 characterized by said receiver member further comprising a return spring connected to said steering lock pin that is adapted for removing said steering lock pin from said holes in said head tube and said steering fork tube when said coupler member is separated from said receiver member.

* * * * *